Sept. 20, 1927.
R. BEYER
1,642,763
TRANSMISSION MECHANISM
Filed Feb. 1, 1921
3 Sheets-Sheet 3
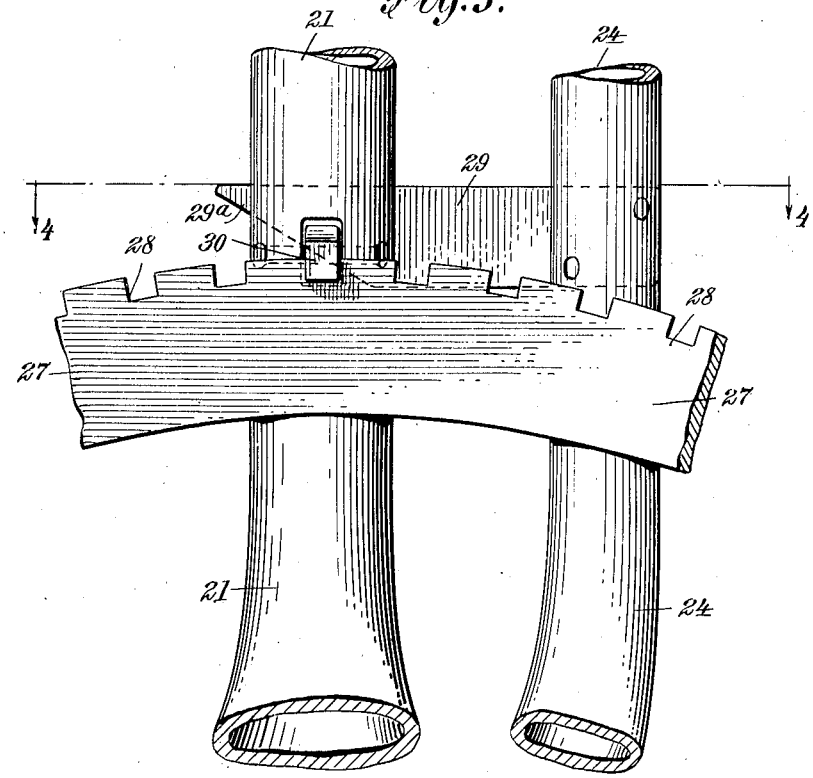
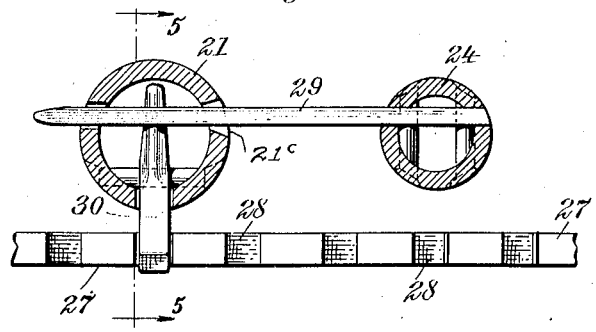
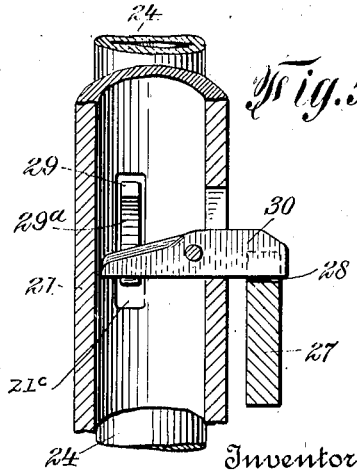

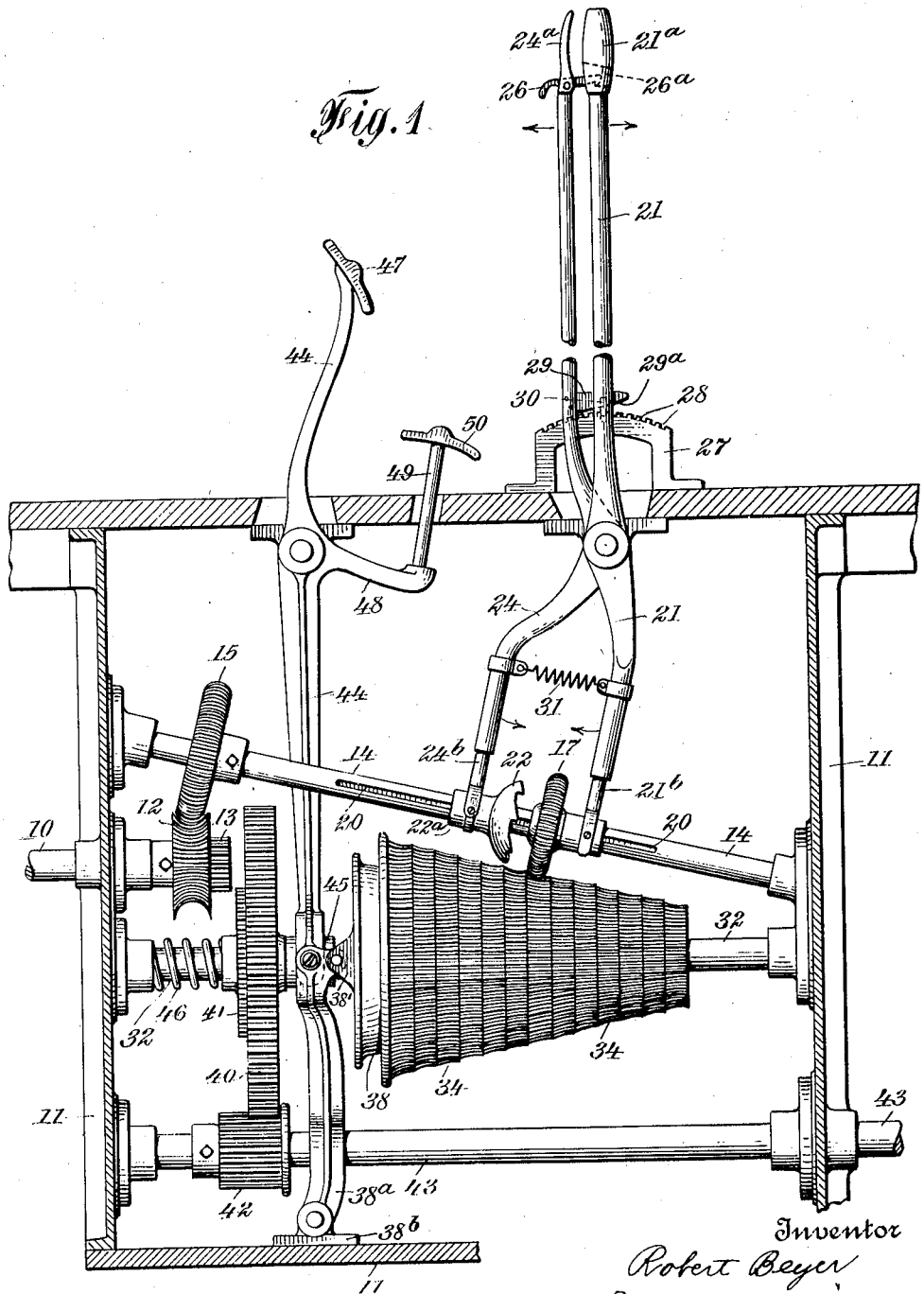

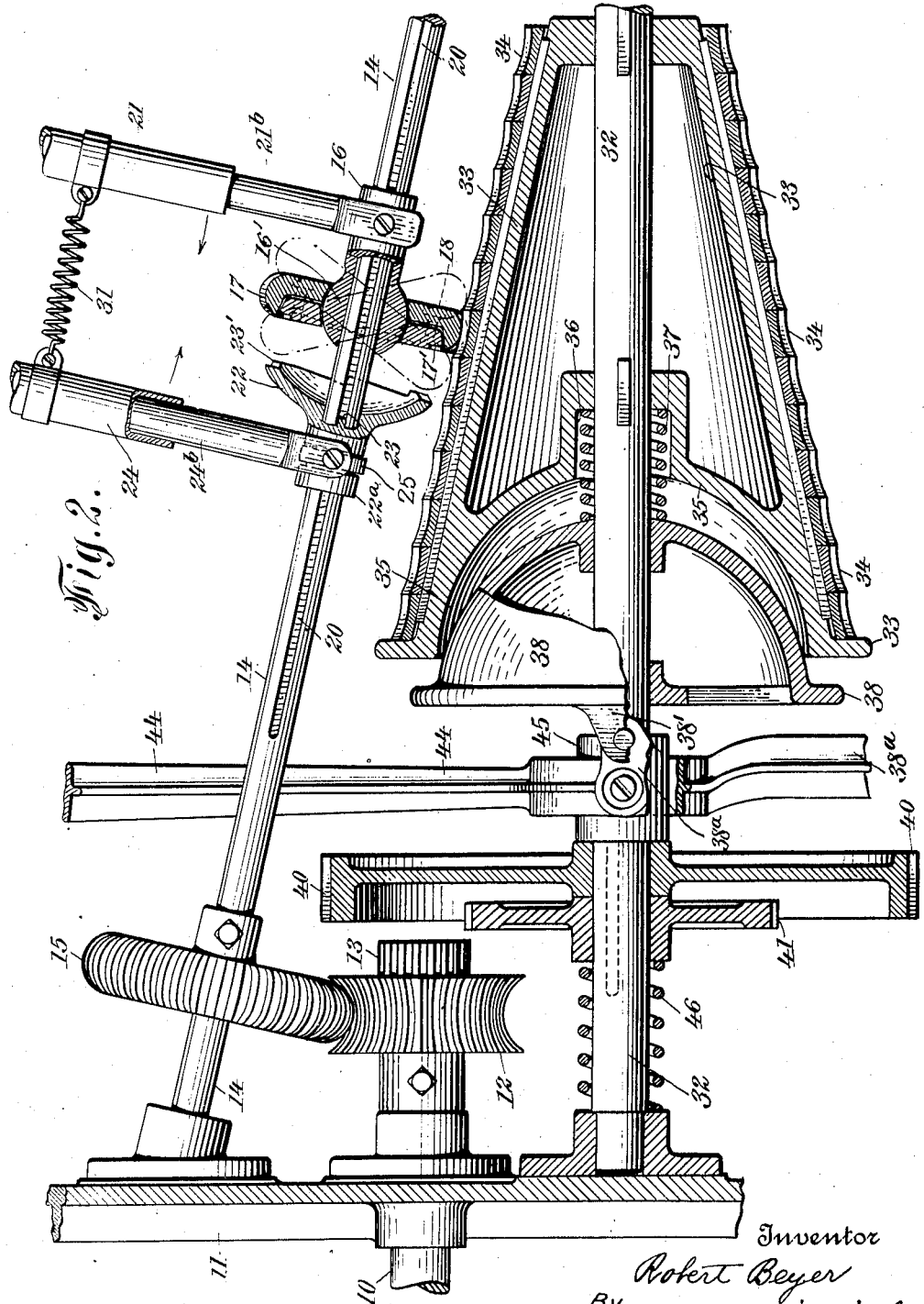

UNITED STATES PATENT OFFICE.

ROBERT BEYER, OF MERAN, ITALY.

TRANSMISSION MECHANISM.

Application filed February 1, 1921. Serial No. 441,531.

My invention relates to improvements in means for controlling the speed and the direction of travel of motor vehicles, and the same has for its object more particularly to provide a simple, compact and efficient apparatus for readily and positively changing the speed or direction of travel of the vehicle.

Further, said invention has for its object to provide a transmission mechanism having combined therewith means for arresting or retarding the movement of the vehicle without necessarily throwing the transmission mechanism out of engagement.

Further, said invention has for its object to provide a mechanism in which a single lever serves to control the brake mechanism and also the reversing mechanism.

Further, said invention has for its object to provide a transmission mechanism providing a large number of speed variations, and means whereby the mechanism may be positively locked when the desired adjustment has been made, and whereby the adjustment may be indicated to the operator.

Other objects will in part be obvious and in part be pointed out hereinafter.

To the attainment of the aforesaid objects and ends my invention consists in the novel details of construction, and in the combination, connection and arrangement of parts hereinafter more fully described and then pointed out in the claims.

In the accompanying drawing wherein like numerals of reference indicate like parts—

Fig. 1 is a side elevation showing one form of transmission mechanism constructed according to, and embodying my said invention;

Fig. 2 is an enlarged detail side view showing certain of the parts broken away and in section;

Fig. 3 is an enlarged detail rear or inner side view of the transmission and brake operating levers and also showing the means for holding the transmission lever to its adjusted position;

Fig. 4 is a detail transverse section taken on the line 4—4 of Fig. 3; and

Fig. 5 is a detail vertical section on the line 5—5 of Fig. 4.

In said drawings, 10 designates the main driving shaft of the engine having its rear end extending into the transmission housing 11, and having fixed upon said inner end a gear 12 and a pinion 13.

14 denotes an inclined shaft having its ends supported in bearings provided in the ends of the housing 11, and upon said shaft 14 is fixed a gear 15 meshing with the gear 12 of the main driving shaft 10. Upon said inclined shaft 14 is slidably disposed a sleeve 16 having an enlarged rounded portion 16' upon which is disposed a gear 17 composed of two parts bolted together by screws 18. The said gear is preferably formed with convex teeth and is loosely disposed upon the rounded portion 16' so as to be capable of rotating thereon with a nutating or oscillating movement. The sleeve 16 is loosely arranged upon the shaft 14 so as to be freely movable longitudinally thereon without being rotated thereby.

21 denotes an operating lever, which is pivotally secured in the top of the transmission housing 11, and has its lower end forked and pivotally secured to the sleeve 16.

22 denotes a clutch member which is also slidably disposed upon the shaft 14 and keyed thereto by a spline 23 engaging the groove 20. The clutch member 22 is provided in its front face with a series of teeth or projections 23' which are adapted to engage with corresponding recessess 17' provided in the face of the loose gear 17.

24 denotes an operating lever which is pivotally mounted upon the same pivot with the operating lever 21, and has its lower end forked and pivotally connected to a collar 25 loosely embracing the sleeve 22ª of the clutch part 22 in order to permit of the clutch part 22 to be rotated within the forked end of the lever 24 by the shaft 14.

The upper end of the lever 21 is provided with a handle 21ª, and the lever 24 is provided at its corresponding end with a handle portion 24ª having a detent 26 adapted to engage with a recess 26ª in said handle portion 21ª whereby to hold the levers 21 and 24 locked together, and the clutch part 22 out of engagement with the gear 17.

Upon the housing 11, adjacent to the pivoted ends of the levers 21, 24, is secured a sector 27 having a series of notches 28 therein corresponding in number with the speed gears hereinafter described. The lever 24 is provided adjacent to the sector 27 with a cam projection 29 whose inclined end 29ª is adapted to extend into a slot 21° in the operating lever 21 and engage with the inner end of a pawl 30 pivotally secured within said lever 21. The pawl 30 has its projecting end heavier than its inner end, so that the same will, by gravity, drop into any one of the notches 28 of the sector 27 when the detent 26 in the upper end of the lever 24 is released from its engagement with the recess 26ª of the lever 21. The detent 30 is released from the sector 27 by the cam projection 29 when the handle portions 21ª, 24ª are gripped to disengage the clutch member 22 from the gear 17. In order to hold the upper ends of the levers 21, 24, normally in separated relation, and the clutch 22 in engagement with the gear 17, a spring 31 is secured to the lower ends of the levers 21, 24, which tends to hold the same drawn together.

The lower ends of the levers 21, 24, are made tubular in form to receive the lever parts 21ᵇ, 24ᵇ, whereby to provide a telescoping construction.

32 denotes a jack-shaft upon which is fixed a hollow conical member 33 having a series of speed gears 34 keyed thereto which become progressively smaller in diameter as the same approach the smaller end of said conical member 33. The speed gears are preferably formed with concave teeth to mesh with the convex teeth of the gear 17.

The larger end of the conical member 33 is provided with a semi-circular or concave end 35 having a socket 36 within which is disposed a spring 37. The semi-circular concave part 35 serves as one brake part which is adapted to be engaged by the hollow convex brake part 38, which is slidably disposed upon the shaft 32 and held normally out of engagement with the brake part 35 by the spring 37. To prevent the clutch part 38 rotating with the shaft 32, the same is provided with rearwardly extending ears 38' which are pivotally connected to the upper end of a forked arm 38ª whose lower end is pivotally secured to a bearing 38ᵇ on the base of the housing 11.

Upon the jack-shaft 32 are slidably keyed by suitable means a large gear 40 and a smaller gear 41. The gear 40 meshes with a pinion 42 fixed upon a shaft 43 supported in bearings provided in the opposite ends of the transmission housing. The said shaft 43 is connected at its rear end by suitable gearing with the axle or the differential forming part of the rear axle.

The gear 41 is adapted to be brought into mesh with the reverse gear 13 on the main driving shaft 10 by means of the lever 44 pivotally mounted in the top of the transmission casing and having its lower end forked and engaging the upper ends of the forked arm 38ª and a collar 45 slidably disposed upon the shaft 32 intermediate the large gear 40 and brake member 38. The gear 41 is normally held out of mesh with the reverse gear 13 by a spring 46 disposed upon the shaft 32 intermediate the end of the housing 11 and the said gear 41.

The upper end of the lever 44 is provided with a foot-plate or pedal 47 whereby, when said lever 44 is moved forwardly, the lower end thereof will cause the sleeve 45 and the arm 38ª to shift the movable clutch part 38 into engagement with the conforming end portion 35 of the conical member 33. The lever 44 is further provided with an angular arm 48, to which is secured a vertical stem 49 having a foot plate or pedal 50 secured to its upper end whereby, when the same is depressed, the lower end of the lever 44 will be caused to move the collar 45 to the left and force the gear 40 against the spring 46 towards the main driving shaft 10, and the smaller gear 41 into engagement with the reverse gear 13 on said main driving shaft.

The operation of the transmission mechanism is as follows:

It is to be noted that the gears 12 and 15 on the main driving shaft 10 and 14, respectively, are normally in mesh, and that the clutch part 22 when the detent 26 is released will be in engagement with the gear 17, the latter being held by the detent 30 in mesh with one of the speed gears 34. The large gear 40 is normally in mesh with the pinion 42 on the shaft 43 extending to the rear axle. When it is desired to change the speed, it merely becomes necessary to draw the clutch-operating lever 24 towards the transmission lever 21 until the detent 26 in the handle 24ª of the lever 24 engages with the notch 26ª of the lever 21. When the levers are thus brought into the position indicated at Fig. 1, the inclined portion 29ª of the cam member 29 carried by the clutch lever 24 will enter the recess in the lever 21 and engage the rear end of the pawl 30 and depress the said rear end and thereby release the forward end of the pawl 30 from its engagement with the slot 28 in the sector 27. The levers 21 and 24 are now free to move back and forth over the entire surface of the sector 27. When the levers 21 and 24 are thus locked together by the detent 26, the clutch part 22 will be released of its engagement with the recesses 17' in the gear 17, so that the said gear 17 is free to rotate upon the enlarged portion 16' of the sleeve 16, and at the same time be accorded a nutating or oscillating movement of sufficient range to permit of said gear 17 being moved back and forth freely over the series of speed gears 34. When the gear 17 is opposite the appropriate gear 34 on the conical member 33 to afford the desired speed, it merely becomes necessary to release the detent 26 of the lever 24, whereupon the spring 31 intermediate the lower ends of the levers 21 and 24 will draw the same together and cause the clutch part 22 to reengage with the recesses 17' in the gear 17 and hold said gear locked to, and render the same rotatable with the shaft, and at the same time maintain said gear 17 in due mesh with its appropriate or selected speed gear 34. When the parts are thus adjusted, power will be transmitted from the main driving shaft 10 to the gear 12, the gear 15 on the shaft 14, and then by gear 17 to the selected speed gear 34. From said selected speed gear 34 on the conical member 33, upon which the same is mounted, rotation will be communicated to the shaft 32, the large gear 40, to the pinion 42 and to the shaft 43 from which it will be communicated to the rear axle or the differential gearing forming part thereof.

When it is desired to change the direction of the vehicle and cause the same to travel backward, it merely becomes necessary, after disengaging the clutch member 22 from the gear 17, to depress the arm 48 by means of the foot-plate 50 and cause the lower end of the lever 44 and the connected collar 45 and arm 38ª to move to the left and force said large gear 40 and the smaller gear 41 against the opposition of the spring 46, to cause said smaller gear 41 to engage with the reverse pinion 13 on the main driving shaft 10, whereby power will be transmitted to the rear axle from the main shaft 10 through said large gear 40 to the pinion 42 and shaft 43.

When the lever 44 is actuated to shift the movable brake part 38 into contact with the cooperating part 35 on the conical member 33, the retardation of said parts will be attained gradually and without sudden shock or jolt owing to the cushioning action of the air which is momentarily trapped between said parts.

It is to be noted that by means of my improved transmission, the operator is enabled, owing to the peculiar construction and operation of the gear 17 and the manner in which the same is mounted upon the shaft 14, to select any one of the speed gears 34 upon the conical member 33 and cause the vehicle to travel, at will, at any speed desired.

Further, it is to be noted that by means of the simple and compact arrangement of several parts of the transmission, higher speeds are more readily obtainable, and that such results may be attained with a more economical use of lubricants.

Further, it is to be noted that a single lever 44 serves both as a brake to control the speed gears and the reversing gear.

Having thus described my invention, what I claim and desire to secure by Letters Patent is:

1. An apparatus of the character described comprising a main driving shaft, a shaft actuated thereby, a jack-shaft, a series of speed gears and a gear on said jack-shaft, a gear loosely mounted upon said second-named shaft and adapted for engagement with said speed gears, a clutch on said second-named shaft adapted to lock said loose gear thereto, means for shifting said loose gear longitudinally of its shaft to engage with any of said speed gears, a brake to control the operation of said speed gears, a lever for operating said brake and for shifting said first named gear into operative engagement with the main driving shaft, substantially as specified.

2. An apparatus of the character described comprising a main driving shaft, a shaft actuated thereby, a jack-shaft, a series of speed gears and a gear on said jack-shaft, an oscillating gear loosely mounted upon said second-named shaft and adapted for engagement with said speed gears, a clutch on said second-named shaft adapted to lock said loose gear thereto, a lever for shifting said loose gear longitudinally upon its shaft to engage with any of said speed gears, means for maintaining said lever and said loose gear actuated thereby to its adjusted position, a brake to control the operation of said speed gears, a lever for operating said brake adapted to engage the gear on said jack-shaft whereby to shift the same into operative engagement with said main driving shaft, substantially as specified.

3. An apparatus of the character described comprising a main driving shaft, a gear and pinion on said main shaft, a shaft, a gear fixed on said shaft in mesh with the gear on said main driving shaft, a jack-shaft, a series of speed gears and a gear on said jack-shaft, an oscillating gear loosely mounted upon said second-named shaft and adapted for engagement with said speed gears, a lever for shifting said oscillating gear longitudinally upon its shaft to engage with any of said speed gears, a clutch on said second-named shaft adapted to engage with said loose gear whereby to key the same to its shaft, a lever for shifting said clutch into and out of engagement with said loose gear, means for maintaining said clutch and said loose gear in engagement, a brake, a lever adapted, upon movement in one direction, to actuate said brake, and upon movement in the opposite direction, to shift the gear on said jack-shaft into engagement with the reverse pinion on said main driving shaft, substantially as specified.

4. An apparatus of the character described comprising a main driving shaft, a reverse pinion thereon, a shaft actuated by said first named shaft, a jack-shaft, a member fixed upon said jack-shaft, a series of speed gears fixed upon said member, a gear on said jack-shaft, an oscillating gear loosely mounted upon said second-named shaft and adapted for engagement with said speed gears, a brake part on said jack-shaft adapted to engage with the member fixed on said jack-shaft whereby to control the operation of said speed gears, a lever adapted, upon its movement in one direction, to shift said brake part into engagement with the member on said jack-shaft and, upon its movement in the opposite direction, to release said brake part and to shift the gear on said jack-shaft into engagement with the reverse pinion on said main driving shaft, substantially as specified.

5. An apparatus of the character described comprising a main driving shaft, a forward gear and a reverse pinion on said main driving shaft, an inclined shaft, a gear fixed on said inclined shaft in mesh with the forward gear on said main driving shaft, a jack-shaft, a conical member upon said jack-shaft, a series of speed gears fixed upon said conical member, a brake part at one one end of said conical member, a gear on said jack-shaft, an oscillating gear loosely mounted upon said inclined shaft and adapted for engagement with said speed gears, a lever for shifting said oscillating gear longitudinally upon its shaft to engage with any of said speed gears, a clutch on said inclined shaft adapted to engage with said loose gear whereby to key the same to its shaft, a lever for shifting said clutch into and out of engagement with said loose gear, spring means for maintaining said clutch and said loose gear in engagement, means for locking said first-named lever to its adjusted position, a member slidably disposed upon said jack-shaft intermediate said brake part and the gear on said jack-shaft, a lever for actuating said slidably disposed member whereby, when said lever is moved in one direction, it will shift said slidable member and cause the same to engage with the brake part on said conical member, and upon its movement in the opposite direction, to shift the gear on said jack-shaft into operative connection with the reverse pinion on said main driving shaft, substantially as specified.

6. An apparatus of the character described comprising a main driving shaft, a forward gear and a reverse pinion on said main driving shaft, an inclined shaft, a gear fixed on said inclined shaft in mesh with the forward gear on said main driving shaft, a jack-shaft, a conical member mounted upon said jack-shaft, a series of speed gears fixed upon said conical member, a brake part at one end of said conical member, a gear on said jack-shaft, an oscillating gear loosely mounted upon said inclined shaft and adapted for engagement with said speed gears, a sector having recesses therein corresponding to the several speed gears, a lever for shifting said oscillating gear longitudinally upon its shaft to engage with any of said speed gears, a locking member on said lever adapted to engage with the recesses in said sector, to hold said oscillating gear to its adjusted position, a clutch on said inclined shaft adapted to engage with said loose gear whereby to key the same to its shaft, a lever for shifting said clutch into and out of engagement with said loose gear, spring means for maintaining said clutch and said loose gear in engagement, means on said last-named lever adapted to engage with the locking member on said first-named lever to release the same, a brake part movably mounted upon said jack-shaft and adapted to engage with the brake part on said conical member, a member slidably disposed upon said jack-shaft intermediate the movable brake part and the gear on said jack-shaft, a lever for actuating said slidable member whereby, when said lever is moved in one direction, it will shift said slidable member and cause said movable brake part to engage with the brake part of said conical member, and upon its movement in the opposite direction, to shift the gear on said jack-shaft into operative connection with the reverse pinion on said main driving shaft, substantially as specified.

Signed at the city of New York, in the county and State of New York, this 24th day of January, 1921.

ROBERT BEYER.